(12) United States Patent
Blackman

(10) Patent No.: US 9,197,793 B2
(45) Date of Patent: Nov. 24, 2015

(54) MOUTH CAMERA

(71) Applicant: Travis A. Blackman, Scarborough (CA)

(72) Inventor: Travis A. Blackman, Scarborough (CA)

( * ) Notice: Subject to any disclaimer, the term of this patent is extended or adjusted under 35 U.S.C. 154(b) by 0 days.

(21) Appl. No.: 14/262,176

(22) Filed: Apr. 25, 2014

(65) Prior Publication Data

US 2015/0312446 A1 Oct. 29, 2015

(51) Int. Cl.
*H04N 5/225* (2006.01)
(52) U.S. Cl.
CPC .................................. *H04N 5/2251* (2013.01)
(58) Field of Classification Search
CPC ... H04N 5/2251; H04N 5/2252; G03B 19/00; G03B 17/02; G03B 17/48; G03B 29/00; G03B 2217/00; G03B 2217/002; G03B 17/561; G08B 13/19671; G08B 13/19621; G08B 13/19632; G02B 13/001
See application file for complete search history.

(56) References Cited

U.S. PATENT DOCUMENTS

| | | | | |
|---|---|---|---|---|
| 6,028,627 A * | 2/2000 | Helmsderfer | ................. | 348/157 |
| 7,576,800 B2 * | 8/2009 | Swain | ........................... | 348/376 |
| 2008/0131106 A1 * | 6/2008 | Bruce | ............................ | 396/25 |
| 2013/0211270 A1 * | 8/2013 | St. Laurent et al. | ......... | 600/508 |
| 2014/0187875 A1 * | 7/2014 | Paris et al. | ..................... | 600/301 |
| 2015/0119759 A1 * | 4/2015 | Gonzales et al. | ............ | 600/595 |
| 2015/0173666 A1 * | 6/2015 | Smith et al. | .................... | 396/25 |

* cited by examiner

*Primary Examiner* — Aung S Moe
(74) *Attorney, Agent, or Firm* — Elias Borges

(57) ABSTRACT

Here is disclosed a video camera for capturing a video image from a participant's point of view. The video camera is mountable in the participant's mouth by the participant gripping the video camera between his or her upper and lower teeth. The device includes a compact video camera having a lens for gathering a video image and a mouth guard dimensioned to fit comfortably between the participant's upper and lower teeth. The mouth guard has first and second arcuate indentations dimensioned and configured to snuggly receive the participant's upper and lower teeth, respectively. The video camera is housed in a camera housing formed on the mouth guard such that the lens is positioned between the participant's upper and lower teeth and is oriented to gather the video image from outside the participant's mouth.

20 Claims, 3 Drawing Sheets

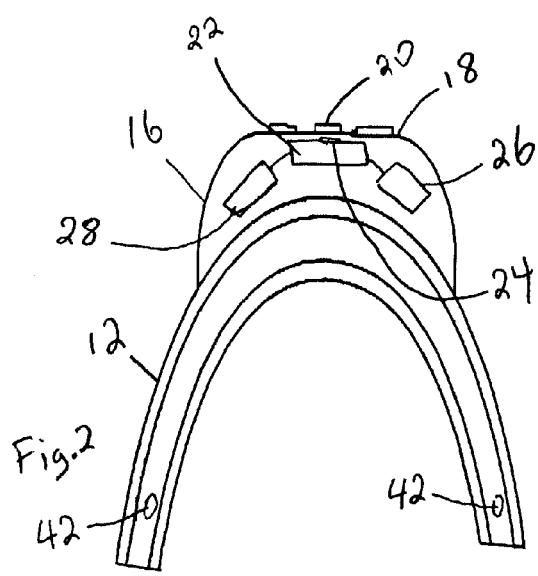
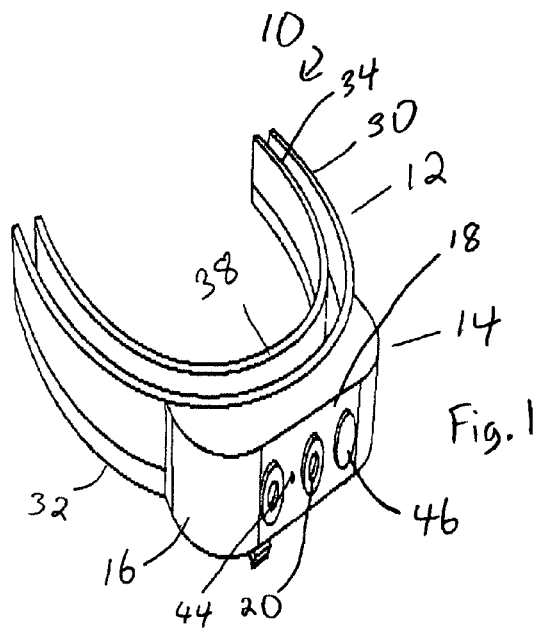
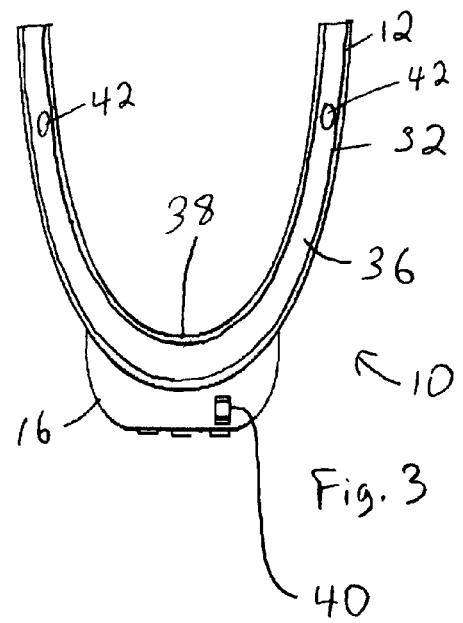
Fig. 1
Fig. 2
Fig. 3

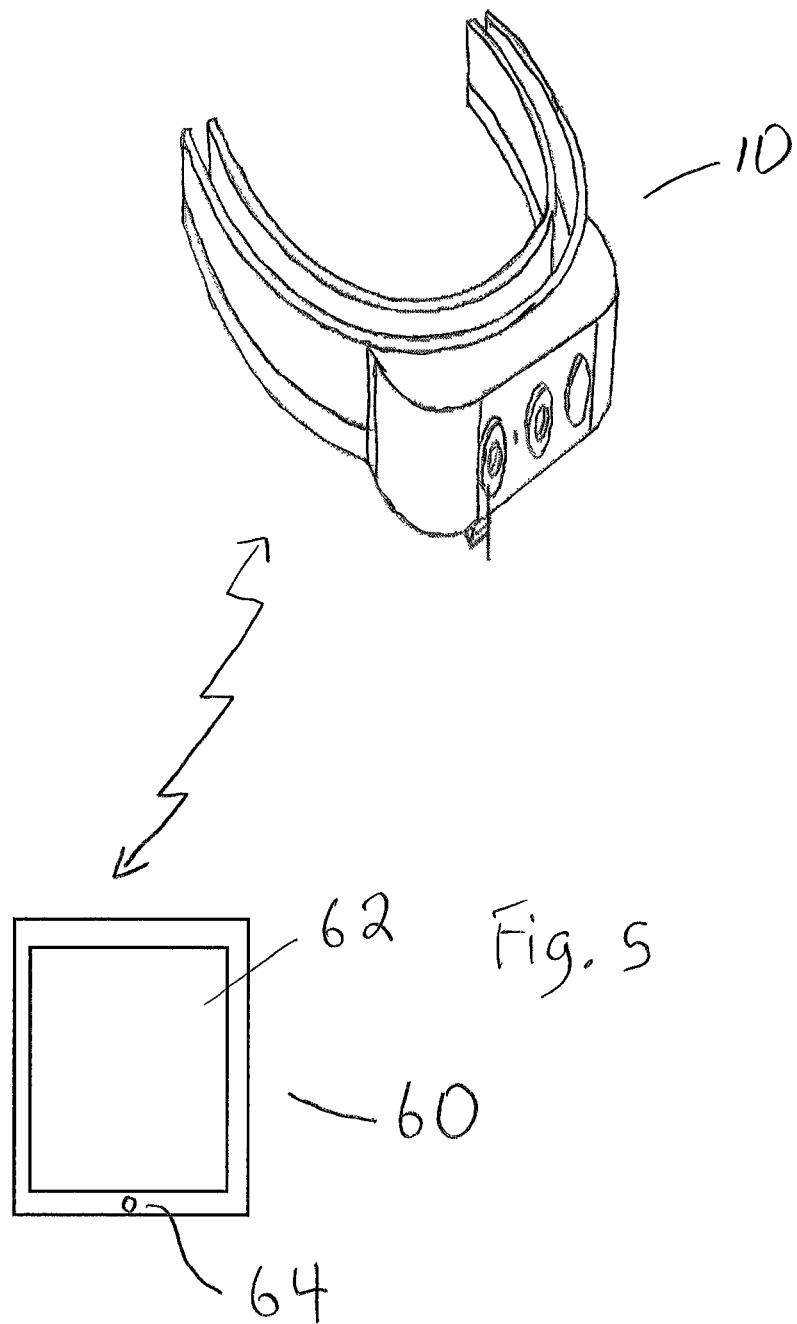

MOUTH CAMERA

FIELD OF THE INVENTION

The invention relates generally to video broadcasting cameras adapted to be held in a user's mouth.

BACKGROUND OF THE INVENTION

Most televised sporting events are recorded by means of video cameras. These cameras are usually mounted adjacent the arena or playing field where the sporting event is being held and are positioned to get a clear view of the participants involved. The resulting video images capture a third person view of the sporting event showing the participants in the event. While this view is often quite useful and entertaining, a first person view is often requested so that the viewing audience can experience the sporting event from the participant's point of view. Several attempts have been made to re-create the first person point of view. In particular, in recent years portable rugged "action cameras" have been developed which can be mounted to a participant's helmet in order to capture the first person point of view. While this approach is suitable for many events, it is not always suitable for all sporting events. For the sport of boxing for example, mounting a camera to a helmet would simply not be permitted as it may lead to injuries. Furthermore, positioning a camera on a helmet places the camera at an angle from the participants point of view. The helmet mounted camera, therefore, does not quite capture the player's point of view but rather captures a view up to 30 cm away from the participant's point of view. An improved video camera which is not helmet mounted but which captures an image closer to the wearer's point of view is therefore required.

SUMMARY OF THE INVENTION

In accordance with one aspect of the present invention, there is provided a video camera for capturing a video image from a participant's point of view. The video camera is mountable in the participant's mouth by the participant gripping the video camera between his or her upper and lower teeth. The device includes a compact video camera having a lens for gathering a video image and a mouth guard dimensioned to fit comfortably between the participant's upper and lower teeth. The mouth guard has first and second arcuate indentations dimensioned and configured to snuggly receive the participant's upper and lower teeth, respectively. The video camera is housed in a camera housing formed on the mouth guard such that the lens is positioned between the participant's upper and lower teeth and is oriented to gather the video image from outside the participant's mouth.

In accordance with another aspect of the present invention, there is provided a video camera device for capturing a video image from a participant's point of view by mounting the video camera in the participant's mouth between the participant's upper and lower teeth. The device includes a compact video camera having a lens for gathering a video image and a U shaped member having upper and lower sides. The U shaped member being dimensioned and configured such that the U shaped member can be held by the participant by gripping the U shaped member between the upper and lower teeth. A camera housing for containing the compact video camera is formed on a front portion of the U shaped member. The camera housing has a front face with a camera aperture aligned with the lens, the camera housing configured to orient the camera such that the lens is pointed away from the participant.

In accordance with another aspect of the present invention, there is provided a video camera device for capturing a video image from a participant's point of view by mounting the video camera in the participant's mouth between the participant's upper and lower teeth and the participants upper and lower lips. The camera device includes a compact video camera having a lens for gathering a video image and a mouth guard dimensioned to fit comfortably between the participant's upper and lower teeth. The mouth guard has first and second arcuate indentations dimensioned and configured to snuggly receive the participant's upper and lower teeth, respectively. The video camera is contained in a camera housing formed on the mouth guard such that the lens is positioned between the participant's upper and lower teeth and is oriented to gather the video image from outside the participant's mouth. The mouth guard is further configured to position the camera housing to project beyond the participant's lips when the mouth guard is gripped in the mouth of the participant.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

FIG. 1 is a perspective view of a perspective view of a mouth camera made in accordance with the present invention.

FIG. 2 is a top view of the mouth camera shown in FIG. 1.

FIG. 3 is a bottom view of the mouth camera shown in FIG. 1.

FIG. 5 is a schematic view of the mouth camera being coupled to an external video monitor and microphone.

In the drawings like characters of reference indicate corresponding parts in the different figures.

DETAILED DESCRIPTION OF THE INVENTION

Figure 4:
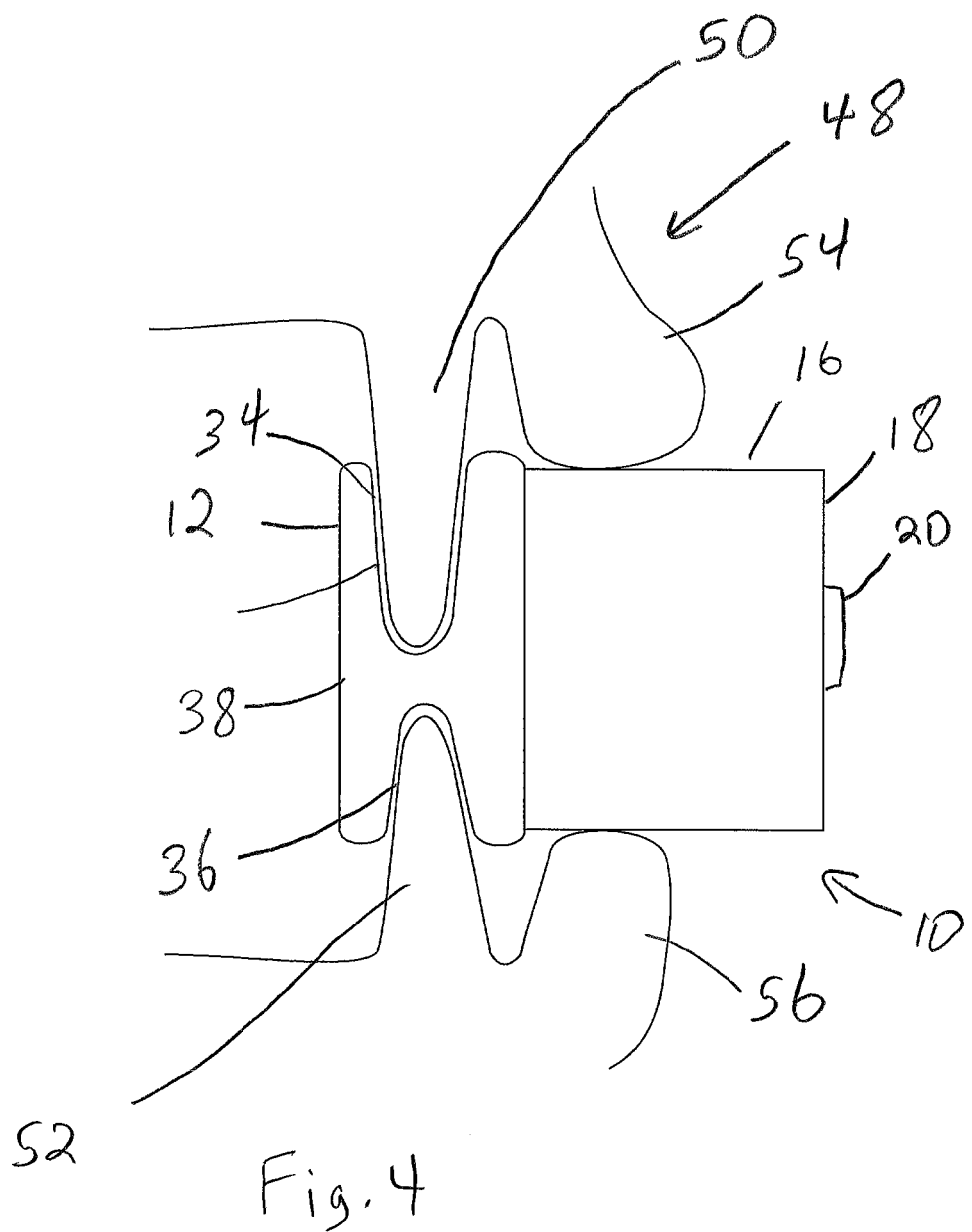
FIG. 4 is a cross sectional view of the mouth camera shown in FIG. 1 being gripped in a participant's mouth.

Referring to FIG. 1 a mouth grippable camera device made in accordance with the present invention is shown generally as item 10 and consists of a mouth guard (or tooth gripping member) 12 coupled to a video camera 14 at a forward portion 38 of the mouth guard. Video camera 14 consists of a compact video camera module contained in a camera housing 16. Camera housing 16 has a camera aperture 20 formed on a front face 18 to permit the compact video camera module to gather a video image from in front of the device 10.

As best seen in FIG. 2, compact video camera module 22 has a lens 24 which is coaxially aligned with aperture 20. Cameral module 22 is coupled to rechargeable battery pack 26 and is preferably coupled to wireless transmitter/receiver 28. Speakers 42 are formed on mouth guard 12 and coupled to camera module 22 so that, when activated, they can transmit sound directly from the module to the participant wearing the mouth guard through the participant's jaw. The video camera module preferably consists of a small circuit board upon which a standard CMOS or CCD video camera module is mounted. The CMOS/CCD video camera module is capable of recording video images preferably in high definition at a rate of at least 30 to 60 frames per second. The video images can be stored on the circuit board by means of a flash memory device or even a micro SD card. Several suitable compact video camera modules which can be incorporated into small devices such as smart phones or key fobs are commercial available from different suppliers. For example, several suitable compact video camera modules can be found on websites such as alibaba.com.

Referring back to FIG. 1, mouth guard 12 consists of a member which is configured be comfortably gripped by the wearer's teeth. Preferably member 12 consists of a U shaped member having upper side 30 and lower side 32. An elongated indentation 34 is formed on upper side 30 and a corresponding elongated indentation 36 (see FIG. 3) is formed on lower side 32. Indentations 34 and 36 are configured such that they can receive the participant's teeth allowing the participant to firmly hold camera 10 while also protecting their teeth with the mouth guard. A microphone 44 may be incorporated into the video camera (or directly wired thereto). Preferably microphone 44 is mounted adjacent camera aperture 20. Another speaker 46 may be mounted to front face 18 in place of speakers 42 (see FIG. 2).

Referring now to FIG. 3, camera housing 16 projects forward relative to mouth guard 12 such that the camera housing extends beyond the participant's lips. This places the video camera in a position to gather an unobstructed view in front of the participant. A water proof port 40 can be positioned on housing 16 so that the camera can be interfaced with an external component such as a battery charger, a computer or external data storage unit. This permits the participant or other users to transfer video data from the camera to another computer or to an external data storage unit. The waterproof port also permits the camera unit to be plugged into an external battery charger to recharge the internal batteries.

Referring now to FIG. 4, as mentioned above, when mouth camera 10 is worn in the participant's mouth 48, indentations 34 and 36 formed on mouth guard 12 receive the participant's upper teeth 50 and lower teeth 52, respectively. Mouth guard 12 acts very much like a standard mouth guard protecting teeth 52 and 50 from injury. Camera housing 16 is positioned at front portion 38 of mouth guard 12 and is configured to project beyond the participant's lips 54 and 56. Front face 18 of camera housing 16 positions camera aperture 20 at a position approximately midway between teeth 50 and 52 and lips 54 and 56. Since camera aperture 20 is positioned in front of lips 54 and 56, the video camera contained in camera housing 16 is capable of capturing a clear and unobstructed image from a point of view very close to the participant's first person point of view.

Referring now to FIG. 5, camera unit 10 is preferably configures such that the on board compact video camera is capable of wirelessly communicating with an external receiving device 60. The external receiving device 60 may comprise an external computer, a wireless network interface or a hand held device such as a tablet computer or smart phone. The wireless connection between device 10 and device 60 can be by any standard wireless technology such as WIFI or Bluetooth. Device 60 can be used to operate device 10 so as to turn it on or off, control the frame rate and resolution of the video image being recorded, monitor the battery charge remaining in device 10 and control other parameters relating to the operation of the onboard video camera in device 10. Preferably the wireless connection between devices 10 and 60 is made sufficiently high speed such that device 60 can record a streaming video image from device 10 and record said video image onto screen 62. Also, preferably remote computer device 60 is provided with a microphone 64 and preferably devices 60 and 10 are configured such that device 60 can send audio signals wirelessly to device 10, permitting someone remote from device 10 to discreetly talk to the participant wearing device 10. This would enable a coach to talk to a boxer or player during a game or match without having other players or participants overhear the conversation.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims Therefore, what is claimed is:

1. A video camera for capturing a video image from a participant's point of view by mounting the video camera in the participant's mouth between the participants upper and lower teeth, the camera comprising:
   a. A compact video camera for gathering a video image;
   b. A tooth grip member dimensioned to fit comfortably between the participant's upper and lower teeth;
   c. The tooth grip member having first and second indentations dimensioned and configured to snuggly receive the participant's upper and lower teeth, respectively;
   d. The video camera being contained in a camera housing coupled to the tooth grip member such that the compact video camera is positioned between the participants's upper and lower teeth and is oriented to gather the video image from outside the participant's mouth.

2. The video camera of claim 1 wherein the tooth grip member is configured to position the camera housing to project outside the participant's mouth when the tooth grip member is gripped in the mouth of the participant.

3. The video camera of claim 1 further including a speaker physically coupled to the tooth grip member, a remote microphone being wirelessly coupled to the speaker.

4. The video camera of claim 1 wherein the compact video camera is wirelessly coupled to a receiver remote from the compact video camera.

5. The video camera of claim 1 wherein the compact video camera includes a microphone, the microphone positioned adjacent the camera aperture.

6. The video camera of claim 1 wherein a soft polymer band is formed on upper and lower sides of the tooth grip member, the first and second indentations being formed in the soft polymer band of the upper and lower sides of the tooth grip member, respectively.

7. The video camera of claim 1 wherein the camera housing further comprises a waterproof port for coupling the compact video camera to an external component.

8. A video camera for capturing a video image from a participant's point of view by mounting the video camera in the participant's mouth between the participants upper and lower teeth, the camera comprising:
   e. A compact video camera for gathering a video image;
   f. A U shaped member having upper and lower sides, the U shaped member being dimensioned and configured such that the U shaped member can be held by the participant by gripping the U shaped member between the upper and lower teeth;
   g. A camera housing coupled to a front portion of the U shaped member, the camera housing having a front face with a camera aperture aligned with the compact video camera, the camera housing configured to orient the compact video camera such that it is pointed forward relative to the participant.

9. The video camera of claim 8 wherein upper and lower recesses are formed on the upper and lower sides of the curved member, respectively, the upper and lower recesses being dimensioned and configured to receive the upper and lower teeth, respectively.

10. The video camera of claim 9 further including a speaker physically coupled to the U shaped member, a remote microphone being wirelessly coupled to the speaker.

11. The video camera of claim 9 wherein a soft polymer band is formed on the upper and lower sides of the U shaped member, the upper and lower recesses are formed in the soft polymer band.

12. The video camera of claim 8 wherein the U shaped member is configured to position camera housing to project outside the participant's mouth when the U shaped member is gripped in the mouth of the participant.

13. The video camera of claim 8 wherein the compact video camera is wirelessly coupled to a receiver remote from the compact video camera.

14. The video camera of claim 8 wherein the compact video camera includes a microphone, the microphone positioned adjacent the camera aperture.

15. The video camera of claim 8 wherein the camera housing further comprises a waterproof port for coupling the compact video camera to an external component.

16. A video camera for capturing a video image from a participant's point of view by mounting the video camera in the participant's mouth between the participants upper and lower teeth and the participants upper and lower lips, the camera comprising:

h. A compact video camera for gathering a video image;
    i. A mouth guard dimensioned to fit comfortably between the participant's upper and lower teeth;
    j. The mouth guard having first and second arcuate indentations dimensioned and configured to snuggly receive the participant's upper and lower teeth, respectively;
    k. The video camera being contained in a camera housing coupled to the mouth guard such that the compact video camera is positioned between the participant's upper and lower teeth and is oriented to point forward relative to the participant, and
    l. wherein the mouth guard is configured to position the camera housing to project beyond the participant's lips when the mouth guard is gripped in the mouth of the participant.

17. The video camera of claim 16 further including a speaker physically coupled to the U shaped member, a remote microphone being wirelessly coupled to the speaker.

18. The video camera of claim 16 wherein the compact video camera is wirelessly coupled to a receiver remote from the compact video camera.

19. The video camera of claim 16 wherein the compact video camera includes a microphone, the microphone positioned adjacent the camera aperture.

20. The video camera of claim 16 wherein the camera housing further comprises a waterproof port for coupling the compact video camera to an external component.

\* \* \* \* \*